Aug. 13, 1929.   C. W. BALKE   1,724,065
RECTIFIER ELECTRODE
Filed Jan. 14, 1928
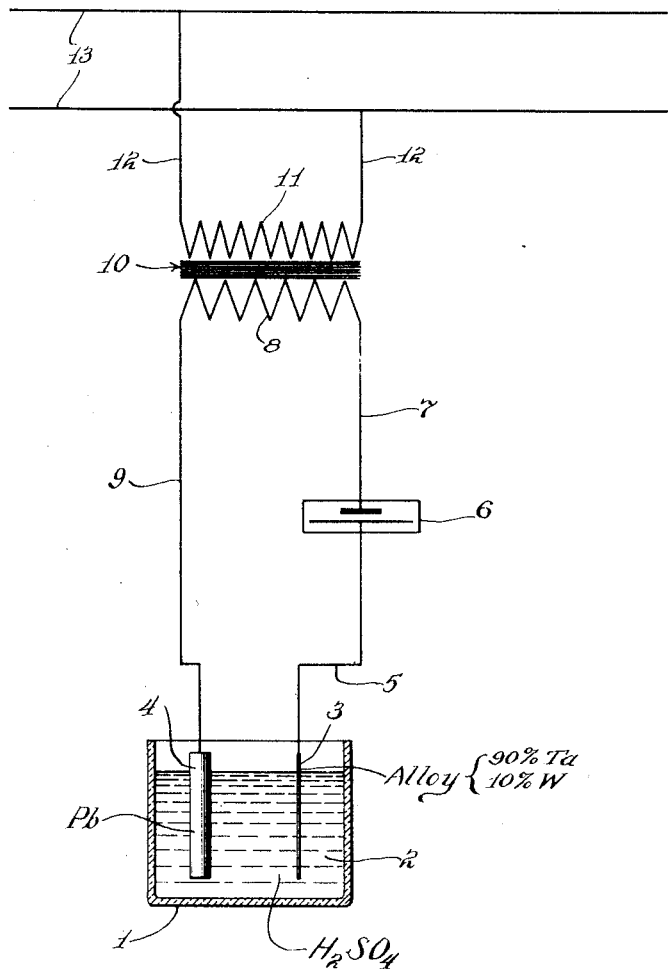

Patented Aug. 13, 1929.

1,724,065

UNITED STATES PATENT OFFICE.

CLARENCE W. BALKE, OF HIGHLAND PARK, ILLINOIS, ASSIGNOR TO FANSTEEL PRODUCTS COMPANY, INC., OF NORTH CHICAGO, ILLINOIS, A CORPORATION OF NEW YORK.

RECTIFIER ELECTRODE.

Application filed January 14, 1928. Serial No. 246,675.

This invention relates to rectifier electrodes and pertains more particularly to electrodes for use in alternating current rectifiers of the electrolytic type which uses a film forming and a non-film forming electrode in an acid electrolyte.

For ordinary purposes, tantalum has been found to be substantially permanent as a film forming electrode. However, when it is used to charge accumulators of low voltage at low charging rates, for instance, power supplies for operating railway signal relays, it has been found that a black coating deposits on the tantalum electrodes and that they tend to become brittle. The operating condition referred to, that is, the charging of a one-cell battery as used on railway track circuits, is most severe, and the problem of providing a permanent electrode in such a rectifier is more serious because railway switch controls and signal relays must be absolutely dependable.

The object of this invention is to provide a film forming electrode that will be substantially permanent when used to charge accumulators of low voltages at low charging rates, which will not be coated with a dark deposit and embrittled, and which will be more dependable than the pure tantalum electrodes heretofore used.

Other objects will be apparent as the description of the invention proceeds.

Briefly, the invention consists in replacing the pure tantalum electrode with an alloy of tantalum and tungsten, preferably containing about 90% tantalum and 10% tungsten. The tungsten-tantalum alloy electrodes do not get this black coating and do not get brittle when they are operated under identical service conditions where tantalum electrodes have failed. Pure tantalum electrodes, which were coated and brittle, were replaced with alloy electrodes, using the old electrolyte, the old lead electrode, and operating the cells in the same locations under exactly the same conditions. The alloy electrodes did not form this coating and remained bright on their surface after many months of use.

A preferred embodiment of my invention is illustrated in the accompanying drawing which represents diagramatically the rectifier circuit embodying my invention.

A receptacle 1 of suitable acid-proof material contains an electrolyte 2, preferably sulphuric acid (specific gravity 1.250), to which certain salts, preferably iron and cobalt sulphate, have been added.

Although I have found that sulphuric acid of the above specific gravity gives the best results, I do not limit myself to this specific gravity or to this electrolyte. Obviously the specific gravity is not critical, and it will vary from time to time in the operation of the cell. Any electrolytes which can be used with tantalum can also be used with my improved alloy, as will be apparent to any one skilled in the art. I have found, however, that sulphuric acid with the addition of iron and cobalt sulfate yields results far superior to those obtained by any other electrolyte.

The film forming electrode 3, in such rectifiers, has heretofore been a strip or ribbon of tantalum. I have discovered that an alloy of tantalum with tungsten has very desirable and unexpected qualities. I preferably use an alloy containing $7\frac{1}{2}$ to 10% tungsten with about 90 to $92\frac{1}{2}\%$ tantalum, although other proportions may be used and other metals added without departing from the spirit of my invention.

The non-film forming electrode 4 is preferably lead.

It is understood, however, that any equivalent may be used for this purpose. Rhodium has been found to give excellent results, and graphite, iron, tungsten, etc., may be used, although I have found that they give inferior results. As will be apparent to those skilled in the art, any non-filming electrode may be used with my improved alloy, which has heretofore been used with a tantalum electrode. The tantalum-tungsten electrode 3 is connected by a conductor 5 to the positive terminal of an accumulator 6. This may be a single lead-plate sulphuric acid cell (2 to 2.5 volts) or a single nickel-iron cell using an alkaline electrolyte (1.5 volts). The structure and operation of these cells are well known and do not need further description.

The negative terminal of the accumulator is connected by a conductor 7 to one terminal of the secondary coil 8, the other end of which is connected by conductor 9 to the lead electrode 4 of the rectifier. Coil 8 is wound on a suitable laminated iron core 10 on which is also wound a primary coil 11 which is connected by wires 12 to the alternating current source 13. In the preferred embodiment, a step-down transformer is used to give a secondary potential of about 10 volts. Such transformers are well known and need no description here.

The size and shape of the rectifier electrodes may be varied to meet different requirements. For ordinary purposes a lead cylinder, about ¾ to 1 inch in diameter and 3 inches long, and a tantalum-tungsten wire, about .042 inches in diameter (or ribbon about ⅛ inch wide) and about 5 inches long, are immersed in about 200 c. c. of electrolyte.

This rectifier, with a secondary potential of 10 volts, will charge a lead-plate cell at about ¾ amperes and a nickel-iron cell at about 1 ampere.

The feature of this invention is the unexpected life of the tantalum-tungsten electrode under the charging conditions stated. A tantalum electrode, which is the nearest approach to a "permanent" electrode heretofore known, will become brittle, corroded, and pitted by the electrolytic gases (probably due to hydrogen absorption) under such conditions, but the alloy overcomes this objection and is substantially permanent.

While I have disclosed a specific embodiment of my invention, I do not limit myself to the details shown except as defined by the following claims.

I claim:

1. An asymmetric conductor comprising an alloy of tantalum and tungsten.

2. An asymmetric conductor comprising a tantalum alloy including about 10% tungsten.

3. A rectifier comprising a film forming electrode of a tantalum-tungsten alloy, a non-film forming electrode, and an electrolyte.

4. A rectifier comprising a tantalum-tungsten alloy electrode, a lead electrode, and a sulphuric acid electrolyte.

5. A rectifier for charging storage cells of low voltages at low charging rates, comprising a tantalum-tungsten electrode and a non-film forming electrode in an electrolyte.

In witness whereof, I hereunto subscribe my name this 10th day of January, 1928.

CLARENCE W. BALKE.